United States Patent [19]
Morgenthale et al.

[11] Patent Number: 5,831,176
[45] Date of Patent: Nov. 3, 1998

[54] FLUID FLOW MEASUREMENT ASSEMBLY

[75] Inventors: U. Peter Morgenthale, Seattle; Charles S. Karr, Issaquah; Terence J. Iadanza, Seattle; Leslie D. Music, Federal Way, all of Wash.

[73] Assignee: The Boeing Company, Seattle, Wash.

[21] Appl. No.: 410,485

[22] Filed: Mar. 24, 1995

[51] Int. Cl.$^6$ .................................................. G01F 15/00
[52] U.S. Cl. ..................... 73/861.77; 73/861.83
[58] Field of Search ................................ 73/198, 861.77, 73/861.79, 861.83

[56] References Cited

U.S. PATENT DOCUMENTS

| | | | |
|---|---|---|---|
| 2,800,022 | 7/1957 | Granberg | 73/231 |
| 3,053,086 | 9/1962 | Granberg | 73/230 |
| 3,060,740 | 10/1962 | Granberg | 73/230 |
| 3,201,987 | 8/1965 | Ackerman | 73/231 |
| 3,241,366 | 3/1966 | Allen | 73/230 |

(List continued on next page.)

OTHER PUBLICATIONS

Mattingly, G.E., "The Characterization of a Piston Displacement–Type Flowmeter Calibration Facility and the Calibration and Use of Pulsed Output Type Flowmeters," *Journal of Research of the National Inst. of Standards and Technology*, vol. 97, No. 5, Sep.–Oct. 1992, pp. 509–531.

(List continued on next page.)

*Primary Examiner*—Richard Chilcot
*Assistant Examiner*—Jewel Artis
*Attorney, Agent, or Firm*—Seed and Berry LLP

[57] ABSTRACT

A fluid flow measurement assembly is shown and described. In a preferred embodiment, a flow conditioning section comprised of straightening vanes and a diffuser, as well as temperature probes, pressure transducers, and a metering assembly, are all provided in an integral housing. The assembly is provided with different sized flanges on an inlet orifice and an exit orifice, such that the assembly may be installed in a fluid line in only one direction, thereby preventing incorrect installation.

The flow conditioning section is comprised of a diffuser and straightening vanes, and serves to ensure that fluid flowing through the measurement assembly is uniformly scrambled and then normalized, such that the metering assembly will be substantially insensitive to upstream flow disturbances and will provide accurate and repeatable fluid flow measurements.

The metering assembly is comprised of two counter-rotating turbines, a pickoff device or pulse detector being provided for each turbine. The assembly is provided with a single connector that is coupled to leads of the temperature probes, pressure transducers and pulse detectors, such that these components may be coupled to a processor external to the housing, simply and accurately.

In calibrating the measurement assembly and in calculating the volumetric or mass flow rate of a fluid, a K factor for each turbine at a given frequency is determined and added together, the sum of the K factors being plotted against a sum of the frequencies for the two turbines, normalized by the viscosity of the fluid. The turbines are counter-rotating and are hydraulically coupled, such that a change in angular velocity in the upstream turbine will result in an opposite, or compensating change in the downstream turbine. By combining the K factors and frequencies for the turbines, therefore, flow or wear effects are averaged out, and higher resolution or accuracy is achieved given that a higher frequency is used as a reference point.

The effects of the hydraulic coupling combined with tracking a calibrated difference in meter turbine frequency at any given flow rate allows for reliable validation of the gathered data, error detection and post measurement data correction.

13 Claims, 7 Drawing Sheets

U.S. PATENT DOCUMENTS

| | | | |
|---|---|---|---|
| 3,301,052 | 1/1967 | Lee et al. | 73/231 |
| 3,355,947 | 12/1967 | Karlby et al. | 73/230 |
| 3,710,622 | 1/1973 | Hammond et al. | 73/231 R |
| 3,735,637 | 5/1973 | Penet | 73/231 R |
| 3,857,282 | 12/1974 | Doorley et al. | 73/168 |
| 3,934,373 | 1/1976 | Griffo | 73/231 R |
| 3,934,473 | 1/1976 | Griffo | 73/231 R |
| 4,420,976 | 12/1983 | Orloff et al. | 73/304 C |
| 4,534,226 | 8/1985 | Rose | 73/861.84 |
| 4,649,756 | 3/1987 | Feller | 73/861.83 |
| 4,694,681 | 9/1987 | Hoffmann | 73/3 |
| 4,739,494 | 4/1988 | Torii | 364/567 |
| 4,815,323 | 3/1989 | Ellinger et al. | 73/290 V |
| 4,819,183 | 4/1989 | O'Brien et al. | 364/509 |
| 5,085,278 | 2/1992 | Keltner | 169/15 |
| 5,363,699 | 11/1994 | McCall | 73/198 |

OTHER PUBLICATIONS

Craft, D. William, "High Accuracy Fuel Flowmeter: Final Report—Phase IIC and Phase III, The Mass Flowrate Calibration of High Accuracy Fuel Flowmeters,"*NASA Contract Report 187108,* Feb. 1992.

General Electric, "High Accuracy Fuel Flowmeter: Phase II—Final Report," *NASA Contract No. NASA—22139,* 1–341, Oct. 23, 1986.

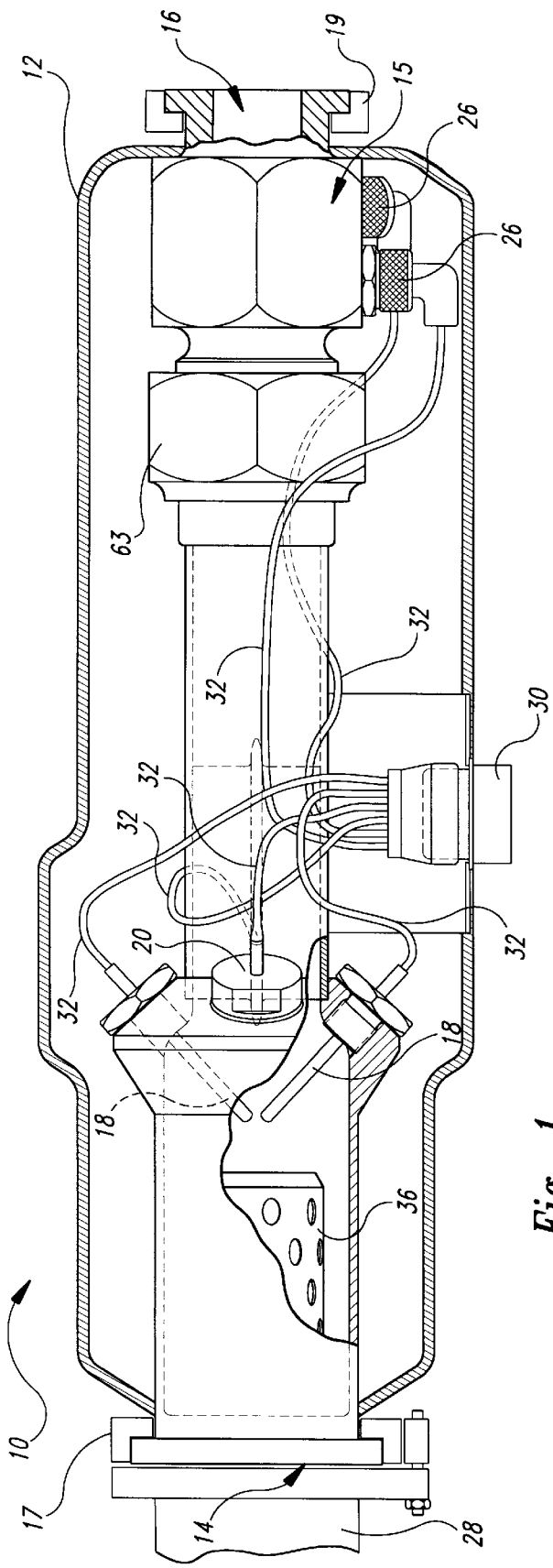
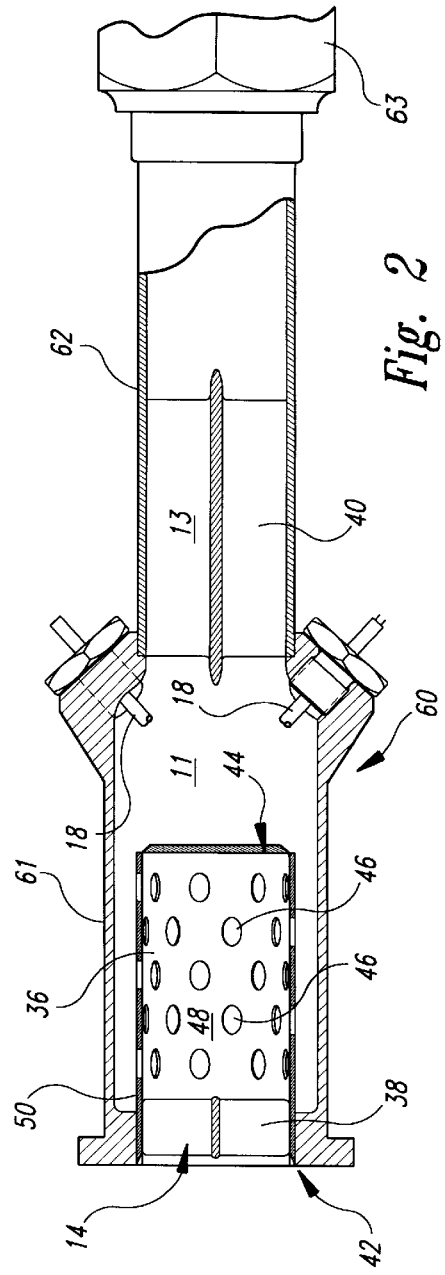
Fig. 1
Fig. 2

FLUID FLOW MEASUREMENT ASSEMBLY

TECHNICAL FIELD

This invention relates to fluid flow meters and, more particularly, to meters and associated sensors which may be used to measure the volumetric flow rate or determine the mass flow rate of a fluid.

BACKGROUND OF THE INVENTION

In many instances, it is desirable to accurately measure the flow rate of a fluid through a given region or system. In some situations, it is particularly desirable to measure the mass flow rate, as opposed to a volumetric flow rate, for example, when tracking the fuel consumption of an aircraft. The desire to not carry more fuel than is necessary demands that accurate measurements of fuel consumption be available to determine how much fuel is remaining at any given time. Accurate fuel flow measurements also aid in rating engine and airplane performance during flight tests.

Currently available systems use turbine flow meters that measure volumetric flow. For redundancy, two flow meters are typically installed in a fuel line, each flow meter being installed with an associated pressure and temperature gauge. Due to space constraints, the meters and associated pressure and temperature gauges are typically separated by some length of tubing. Such systems have several disadvantages, however; for example, it is common for the measurements provided by a first meter to differ substantially from the measurements obtained from the second meter. Currently available systems are typically accurate within 0.5% to 1%.

In an attempt to overcome this problem, fuel flow meters installed as described above have been calibrated in the context of the associated tubing. However, such calibration is cumbersome, time-consuming, and requires that entire tubing sets and flow meters for a particular engine type be stored intact. This type of installation is also error prone because the flow meters can be installed in reverse or swapped, and associated sensors can be connected incorrectly.

A need therefore exists for an improved fluid flow measurement assembly that is simple to calibrate and install, is insensitive to piping configuration, and that will provide accurate, repeatable results.

SUMMARY OF THE INVENTION

It is therefore an object of this invention to provide an improved fluid flow measurement assembly.

It is another object of this invention to provide a fluid flow measurement assembly that is simpler to calibrate and install than currently available systems.

It is another object of this invention to provide a fluid flow measurement assembly that is substantially insensitive to upstream flow disturbances and that will provide accurate repeatable results.

These and other objects of the invention, as will be apparent herein, are accomplished by providing an integral fluid flow measurement assembly. For purposes of illustration, a preferred embodiment of the present invention will be described in the context of an aircraft engine fuel system; however, it will be understood that the present invention may be used in any context where accurate measurement of a fluid flow rate is desired.

In a preferred embodiment, a fluid flow measurement assembly is provided with an inlet and an outlet installed in-line of an engine fuel line. The inlet has a flange that is part of a flow straightening section coupled to a meter body terminating in an outlet flange. A short, bladed straightening vane is provided in the inlet followed by a diffuser tube positioned downstream of the inlet straightening vane. The inlet straightening vane and diffuser are located inside a cylindrical diffuser housing.

In a preferred embodiment, the diffuser is a substantially cylindrical member that is open at a first, upstream end, closed at a second, downstream end, and provided with a plurality of holes in the cylindrical member. Two temperature probes and two pressure transducers are positioned downstream of the diffuser within the diffuser housing, and measure the temperature and pressure of the fluid as it flows through the housing. A second, longer straightening vane is located inside a connecting tube that is welded to the diffuser housing downstream of the temperature probes and pressure transducers. The connecting tube is coupled to a turbine meter body. The meter body contains two turbines that counter-rotate on a shaft. An additional six-bladed straightening vane is provided on the shaft both upstream and downstream of the turbines. The flow is therefore substantially "scrambled" as it exits the diffuser, such that upstream flow disturbances are neutralized. The flow is then substantially straightened in the connecting tube prior to entering the turbines. This allows the meter to produce repeatable results that are substantially insensitive to flow distortions created by features external to the fluid flow measurement assembly.

The two counter-rotating turbines are spaced sufficiently close together to ensure that they are hydraulically coupled, such that a change in speed of the upstream turbine causes an opposite or compensating change in speed of the downstream turbine. The hydraulic coupling may be used to detect defects in the system and to ensure that accurate, repeatable results are achieved. More specifically, a pulse detector is provided for each turbine. The pulse detectors measure the frequency of the turbines in pulses per second, a pulse being counted every time a turbine blade passes by the detector. Each turbine is calibrated by forcing a known volume of fluid through the assembly at a given temperature and pressure, such that "K" factors, namely the detected number of pulses per gallon of fluid at a given temperature and pressure, can thus be determined for each turbine. The K factors are then plotted in a graph versus the frequency of the pulses divided by the viscosity of the fluid. The calibration temperature is stated on the plot. This plot is commonly called a universal calibration curve. In a preferred embodiment, the K factors for the two respective turbines are added together to result in a third calibration curve to take advantage of the close coupled effect in the two turbines.

Using a combined K factor to calculate a volumetric or mass flow rate is also beneficial in that it increases the number of pulses per gallon, or the K factor, thereby increasing the resolution of the measurement and the accuracy of the flow calculation without the penalty of an added fluid pressure drop which is believed would result if a single turbine flow meter was modified to have the same K factor as the combined K factor of the present invention. The frequency of the upstream turbine is preferably 5%–10% slower than the downstream turbine to clearly differentiate the calibration curves for the two turbines while still maximizing the number of pulses per gallon.

In a preferred embodiment, the assembly is provided with a single connector receptacle that is connected to leads of the temperature probes, pressure transducers and pulse detectors. In this manner, the various electrical components of the assembly may be coupled to a system external to the assembly via a single connector, thereby simplifying and ensuring accurate installation. To further ensure that the assembly is installed correctly, unequal flanges are provided on the inlet and outlet of the assembly, such that the assembly may be installed in only one direction.

In a preferred embodiment, the components of the assembly except for the inlet and outlet flanges and the connector, are enclosed within a thermally insulated enclosure, thereby shrouding the components from ambient temperature effects and providing for uniform temperatures within the assembly.

BRIEF DESCRIPTION OF THE DRAWINGS

FIG. 1 is a partial cross-sectional plan view of a fluid flow measurement assembly provided in accordance with a preferred embodiment of the present invention.

FIG. 2 is a cross-sectional plan view of an upstream region of the fluid flow measurement assembly of FIG. 1.

DETAILED DESCRIPTION OF THE INVENTION

Figure 3:
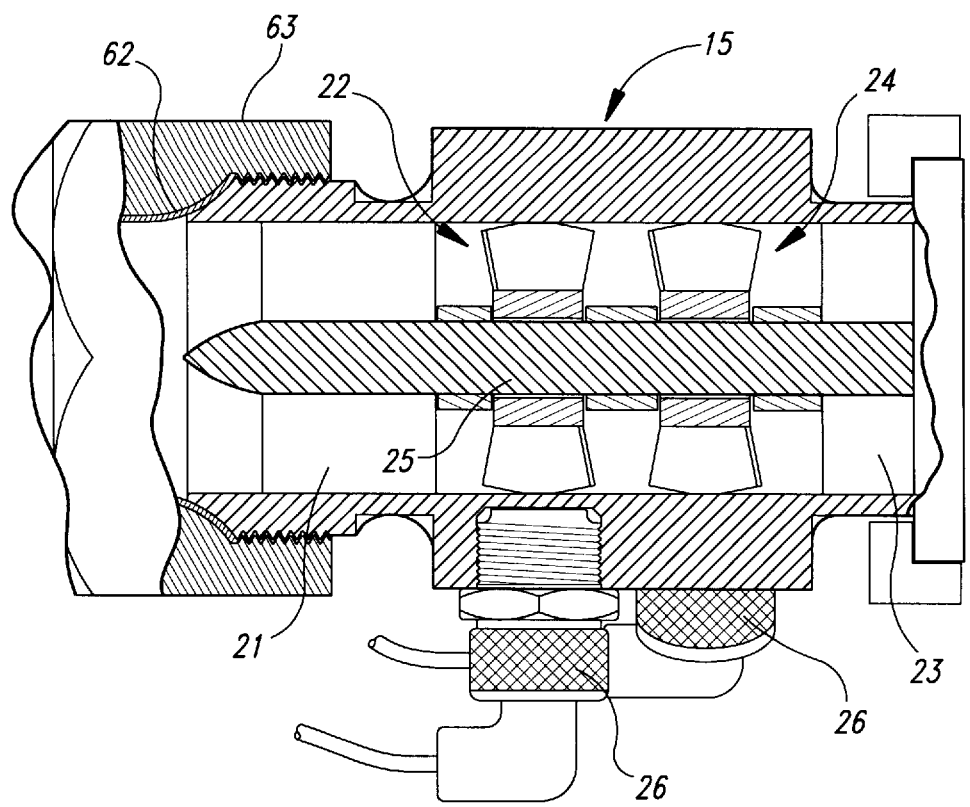
FIG. 3 is a cross-sectional plan view of a flow meter used in the fluid flow measurement assembly of FIG. 1.

In many instances, it is necessary and desirable to accurately measure a fluid flow rate. For example, it is important to measure the flow rate of fuel through an aircraft engine, both for purposes of evaluating engine performance and determining fuel consumption. Currently available systems have disadvantages, however, in that they are prone to be installed incorrectly, and they are sensitive to flow disturbances. This sensitivity to flow disturbances is particularly critical in the environment of an engine fuel line, given that such fuel lines typically have numerous bends and other sources of flow disturbances such as flow controllers, fittings and couplings.

These disadvantages are overcome by providing a fluid flow measurement assembly 10 in accordance with a preferred embodiment of the present invention, as illustrated in FIG. 1. The fluid flow measurement assembly 10 is provided within a thermally insulated enclosure 12, and has an inlet orifice 14 and an outlet orifice 16. As illustrated in FIG. 2, the inlet orifice 14 is adjacent to a flow straightening section 60. A first straightening vane 38 is provided within the inlet orifice 14. A diffuser 36 is provided downstream of the straightening vane 38. The diffuser 36 is substantially cylindrical and has a first open end 42 within the inlet 14, and a closed second end 44. The diffuser 36 has formed therein a plurality of holes 46, that extend from an inner surface 48 through an outer surface 50. The diffuser 36 has an outer diameter that is less than an inner diameter of a diffuser housing 61 surrounding the diffuser 36. Fluid entering the inlet orifice 14 therefore flows into the diffuser 36, and out through holes 46 into chamber 11. In a preferred embodiment, the diffuser 36 is approximately 2.25 inches long, and has five annular rows of nine holes each, the rows being staggered by 20° and spaced by 0.30 inch. Each hole 46 has a diameter of 0.187 inch and a chamfer of 0.02 inch, and a center line of a first row of holes is set back approximately 0.45 inch from the second end 44 of diffuser 36. These dimensions and other dimensions and parameters given throughout this description are for a selected operating condition of a flow rate of 2 to 90 gallons per minute. It will be understood that an operating condition has been selected for illustrative purposes, and that the dimensions of the assembly may be scaled accordingly, depending on the flow rate to be measured.

As illustrated in FIGS. 1 and 2, two temperature probes 18 and two pressure transducers 20 are provided in the diffuser housing 61, downstream of the diffuser 36, such that a temperature and pressure of the fluid are measured as the fluid flows through the flow straightening section 60. Two probes and transducers are used to provide redundant measurements, thereby providing reliable results and helping to identify malfunctions. Although any available method for measuring the temperature and pressure of the fluid may be used, in a preferred embodiment, an RTD temperature probe manufactured by Hy-Cal, part number RTS-4184-AA-XB-1.375-4C-06-X1, is used and an S-type pressure transducer manufactured by Sensotec, part number 0608394-01, is used. To help ensure that the temperature throughout the assembly is uniform, a thermally insulated enclosure 12 is provided which extends between flange 17 and flange 19.

As best seen in FIG. 2, a six-bladed straightening vane 40 is mounted inside the connecting tube 62 downstream of the temperature probes 18 and pressure transducers 20. The inner diameter of the connecting tube 62 surrounding the second straightening vane 40 is less than the inner diameter of chamber 11, such that fluid accelerates as it enters region 13 and flows towards a tube coupling 63 connecting tube 62 to flow meter 15. As best shown in FIG. 3, the flow meter 15 comprises an upstream turbine 22 and a downstream turbine 24. In a preferred embodiment, assuming a flow rate of 2 to 90 gpm, each turbine 22, 24 has eight blades, and the turbines are spaced 0.75 inch apart, although it is believed acceptable results may be achieved with a turbine spacing of 0.5 to 1.0 inch. The turbines 22 and 24 counter-rotate on shaft 25. A straightening vane 21 is provided upstream of turbine 22, and a straightening vane 23 is provided downstream of turbine 24.

Associated with each turbine is a pulse detector 26 that detects the turbine blades as they pass a given point. Although different types of pulse detectors or pickoffs may be used, in a preferred embodiment, a carrier frequency modulated sensor by Spectec is used. By providing a diffuser 36; and straightening vanes 38 and 40, the fluid flowing through the flow straightening section 60 is uniformly scrambled, then rectified, allowing the assembly to provide accurate and repeatable measurements that are substantially insensitive to upstream flow disturbances. A fluid flow measurement assembly provided in accordance with a preferred embodiment of the present invention may therefore be installed into a fluid line at any location where space permits, irrespective of proximity to elbows, fittings, valves and other sources of flow disturbances.

As best seen in FIG. 1, the assembly 10 is provided with a single, multipin connector 30, the connector 30 being coupled to leads 32 from the pressure transducers 20, the temperature probes 18, and the pulse detectors 26. Although a variety of connectors may be used, in a preferred embodiment, a Bendix PT-type receptacle is suggested, having 32 pins, a shell size of 18 and a contact size of 20. As a result, installation is simplified, and accurate connections between the various electrical components of the measurement assembly 10 and the processing system external to the assembly is ensured. To further ensure that the fuel flow measurement assembly 10 is installed correctly, a floating (free to rotate) flange 17 provided at the inlet orifice 14 has a size that is different from the size of a similar flange 19 provided at the outlet orifice 16, such that the assembly 10 may be installed in fuel line 28 in only one direction. However, the assembly 10 can be rotated axially to conveniently locate the connector. The flanges 17 and 19 are bolted to corresponding flanges in the fuel line, and an O-ring seal (not shown) is provided between each pair of flanges. Self-locking nut plate carriers (not shown) may be used to simplify the installation of fasteners.

Figure 4:
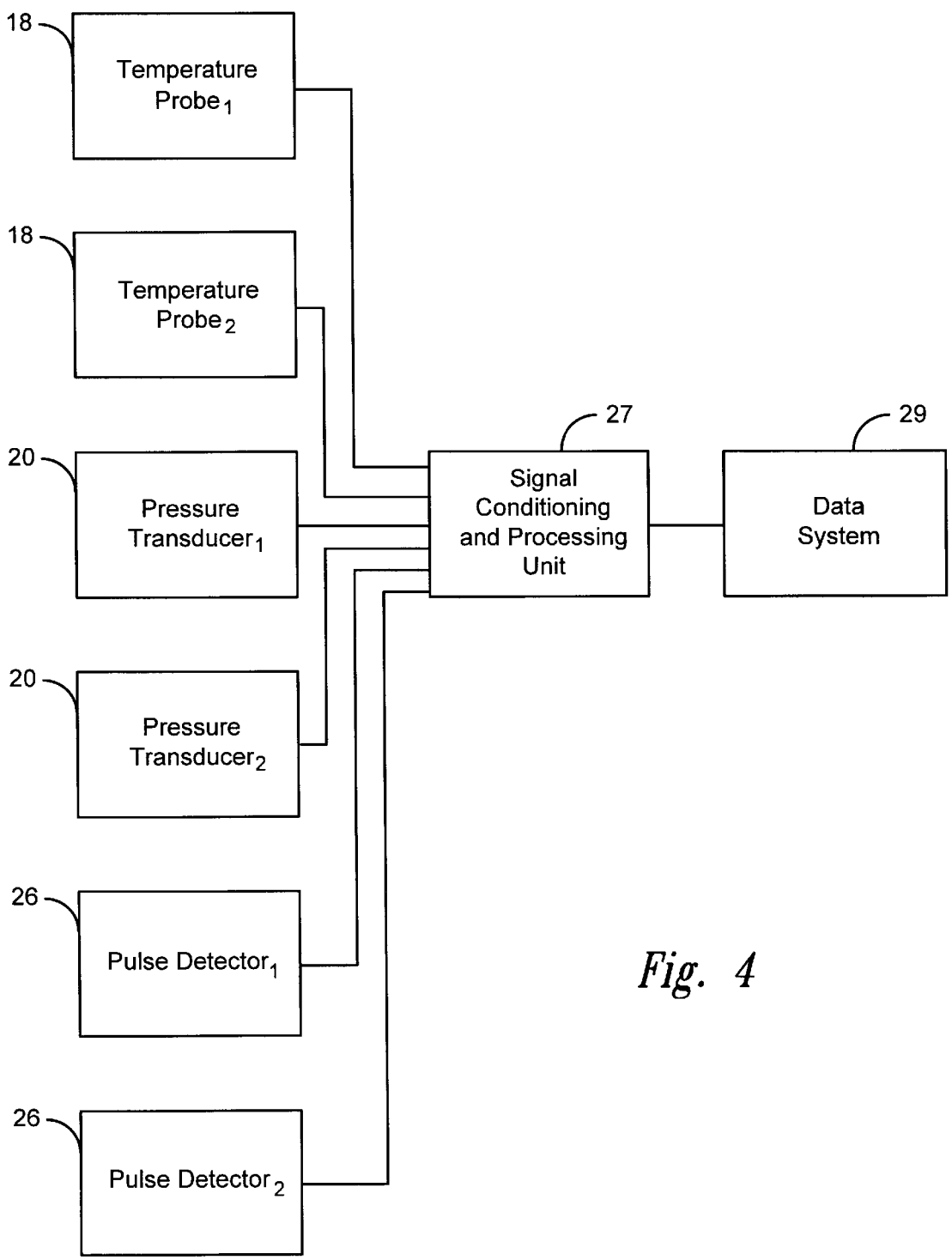
FIG. 4 is a block diagram illustrating the electronic circuitry used in connection with a preferred embodiment of the present invention.

A preferred embodiment of the invention, as illustrated in FIG. 4, includes a signal conditioning and processing unit 27 which connects to the temperature probes 18, pressure transducers 20 and pulse detectors 26. The signal conditioning and processing unit 27 has conventional excitation and signal conditioning circuitry which processes raw signals from the temperature probes 18, the pressure transducers 20 and pulse detectors 26 and converts them into digital signals for processing in a conventional microprocessor contained in unit 27. The signal conditioning and processing unit 27 also contains calibration information for the temperature probes 18, the pressure transducers 20 and the flow meter calibration K factors. In a preferred embodiment of the invention, these calibration values are downloaded onto a hard disc or memory from an external database. In an alternative embodiment, the calibration information is stored on PROMs. The digital signals and calibration values are then processed, as discussed in greater detail below, and volumetric and mass fuel flow values are computed, In a preferred embodiment of the invention, the information thus gathered and computed is then passed on to a data system 29 for display on an operator's console and for recording on a recoverable media, such as magnetic tape or disk.

Figure 5:
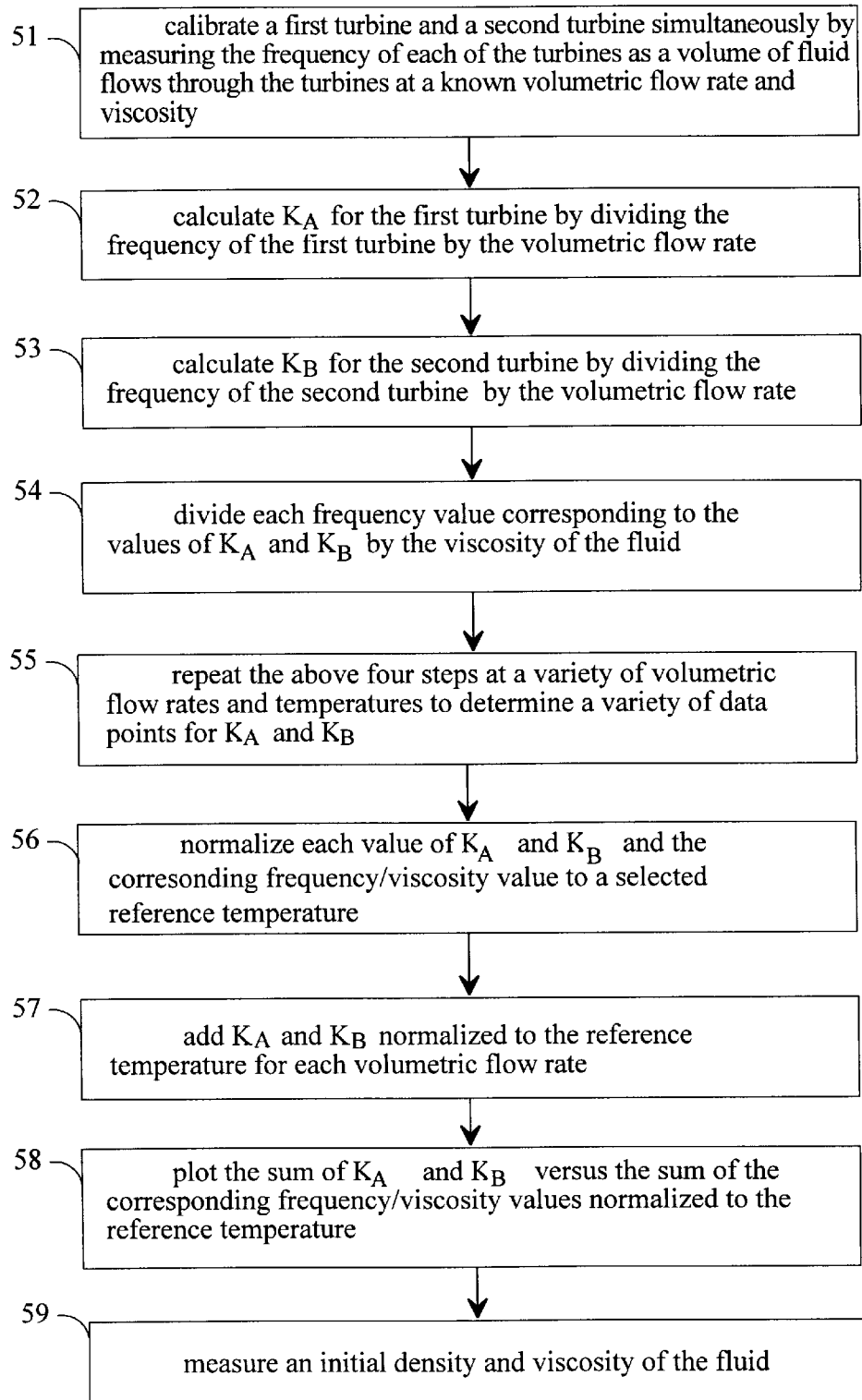
FIG. 5 is a flow chart illustrating the steps of a calibration process that is used in a preferred embodiment of the present invention.

The K factors are determined by a calibration process that is carried out prior to operation of the system. With reference to FIG. 5, the turbines are calibrated simultaneously by measuring the rotational speed or frequency of each turbine as a volume of fluid flows through the turbines at a known volumetric flow rate and viscosity in step 51. For every frequency of each turbine, a "K" value is calculated by dividing the frequency by the known volumetric flow rate in steps 52 and 53. Each turbine frequency value is divided or "normalized" by the viscosity of the fluid in step 54. The calibration process and calculation of a K factor for a given turbine frequency is repeated for a variety of volumetric flow rates and temperatures in step 55, ensuring that several data points are collected for each temperature and that the calibration process covers a range of viscosity and Reynolds numbers expected to be encountered during operation of the meter.

For each condition, the individual turbine K factors and corresponding frequency/viscosity values are normalized to a selected reference temperature by applying conventional meter thermal expansion corrections in step 56. (The normalized K factor is also known as the Strouhal number and the normalized frequency/viscosity value is known as the Roshko number.) It will be understood that conventional corrections may also be applied to account for changes in meter body size due to changes in pressure.

The normalized K factors for the turbines may be plotted to created calibration curves. Traditionally, the normalized K factors are plotted on a y-axis and the corresponding normalized values of frequency divided by the viscosity of the fluid, are plotted on the x-axis. A calibration curve is then "best fit" to these data points. Such a K factor or calibration curve will therefore be specific to the selected reference temperature. In a preferred embodiment, the calibration curve is stored in PROMs (not shown) and the PROMs are then installed in the signal conditioning and processing unit 27, as explained above, to be used in the calculation of a mass flow rate. It will be understood that the calculations may be done by any available method of computing.

In a preferred embodiment, a calibration curve is created for the upstream turbine 22 used in conjunction with the downstream turbine 24. The calibration curve is created by summing, for each data point, the normalized K factors for each turbine in step 57, and plotting these values versus the sum of the normalized frequency/viscosity values for the turbines in step 58 to obtain a "best fit" calibration curve. For a given fluid flow measurement assembly 10, therefore, calibration curves may be generated for the upstream turbine 22 alone, the downstream turbine 24 alone, and for an imaginary third turbine characterized by the sum of the K factors and frequencies for the two individual turbines.

Initial measurements of fluid density and viscosity are taken in step 59, prior to operation of the system, for example, as used in an aircraft. The measurements are used to determine the specific gravity of the fluid at 60° F. This value in turn is programmed into the processing unit 27 and indicates, from available charts and data for different types of fluid, how the density and viscosity will vary with temperature and pressure. This value is therefore used by the processing unit 27 as a starting point for the mass flow calculation.

Figure 6:
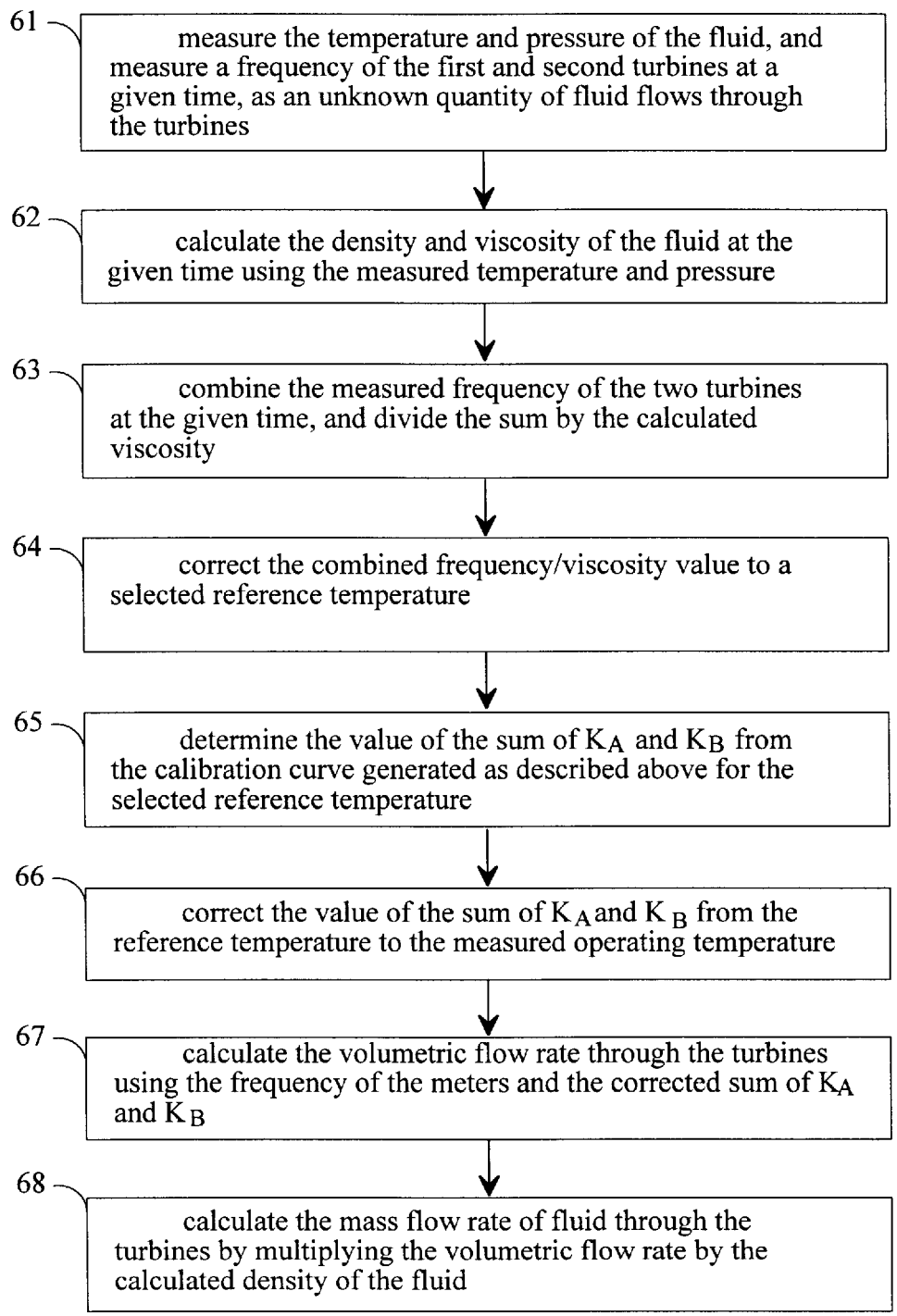
FIG. 6 is a flow chart illustrating the software used to program a processor used in a preferred embodiment of the present invention.

The processing unit 27 operates in accordance with software instructions that will be explained with reference to FIG. 6. Specifically, to calculate the mass flow rate at any given moment during operation of the system, the operating temperature and pressure of the fluid are measured via temperature probes 18 and pressure transducers 20, and a pulse count for each turbine is taken via corresponding pulse detector 26 in step 61. Using the measured temperature and pressure, the processor 29 determines the operating density and viscosity of the fluid in step 62. In a preferred embodiment, the pulse count or frequency of the upstream turbine 22 is added to the frequency of the downstream turbine 24, the sum being normalized or divided by the operating viscosity in step 63. This combined value of frequency/viscosity is corrected to the selected reference temperature by applying conventional thermal expansion corrections in step 64. Given this corrected value, a K factor corresponding to the reference temperature may be determined from the calibration curve in step 65. The K value from the calibration curve is corrected to the operating temperature by applying conventional thermal expansion corrections in step 66. By dividing the measured frequency by the corrected K factor, the volumetric flow rate may be determined in step 67, and the volumetric flow rate may then be multiplied by the calculated density in step 68 to arrive at the mass flow rate for a given point in time. (It will be understood that either a volumetric flow rate or a mass flow rate may be determined as described above. However, it is often desirable to determine a mass flow rate, given that a weight of fluid is insensitive to changes in temperature, unlike a volumetric measurement, which changes with changes in temperature.)

By calculating the volumetric flow rate or mass flow rate in accordance with a preferred embodiment of the present invention, accurate and repeatable results are obtained. By combining the K factors and frequencies of the turbines, a higher number of pulses per second is used as a reference, thereby minimizing the impact of erroneous frequency and viscosity measurements and increasing the resolution or accuracy of the fluid flow rate measurement. In a preferred embodiment, the turbines 22 and 24 and associated pulse detectors 26 are configured such that a minimum of 1500–1900 pulses per gallon of fuel flow are provided to the instrumentation system. While currently available systems are accurate within 0.5% to 1%, measurements provided in accordance with the present invention are accurate within 0.25%. (As noted previously, the turbine configuration and number of pulses per gallon may be scaled accordingly, depending on the range of flow rates to be measured.)

In a preferred embodiment, the turbines 22 and 24 are counter-rotating, and the frequency of the upstream turbine 22 is 5%–10% slower than the frequency of downstream turbine 24. By ensuring that the difference in turbine speed is not too great, a higher combined number of pulses per second will be measured, thereby increasing the accuracy of the measurement. By ensuring that the frequencies of the turbines differ, however, the calibration curves for both meters will be clearly separated and will assist in monitoring the performance of the fluid flow measurement assembly and detecting errors.

Figure 7:
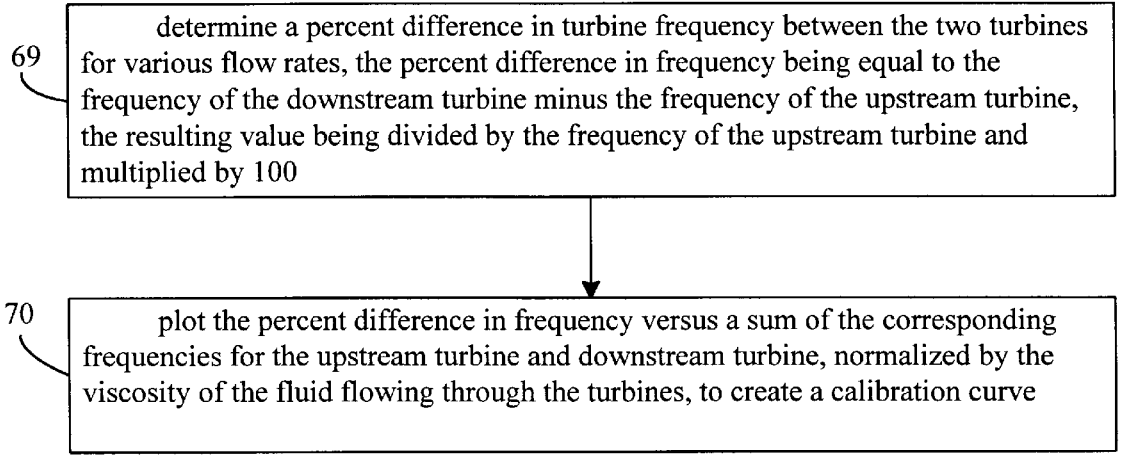
FIG. 7 is a flow chart illustrating the steps of a calibration process that is used in a preferred embodiment of the present invention.
Figure 8:
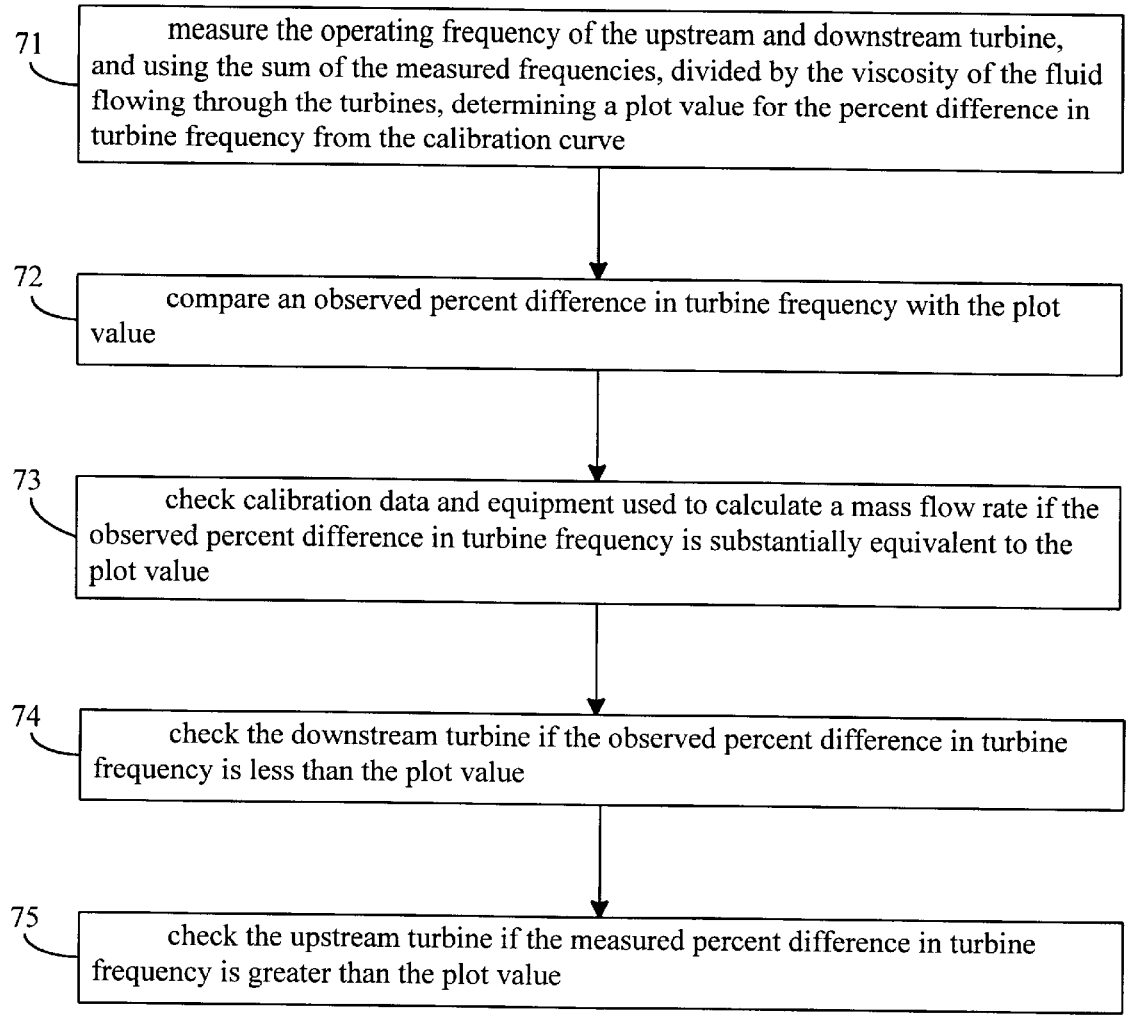
FIG. 8 is a flow chart of software used to program a processor used in a preferred embodiment of the invention for the purpose of isolating errors when taking fluid flow measurements.

More specifically, calibration data is acquired as illustrated in FIG. 7 and is used by the processing unit 27 which may be programmed to isolate errors in the system using the software illustrated in FIG. 8. In step 69 of FIG. 7, the percent difference in turbine frequency for various flow rates is determined and recorded, the percent difference being equivalent to the frequency of the downstream turbine minus the frequency of the upstream turbine. The result of the difference determination is multiplied by 100 and divided by the frequency of the upstream turbine. The values for the percent difference in turbine frequency are then plotted versus the sum of the turbine frequencies normalized by the viscosity of the fluid in step 70 to create a calibration curve. In an alternative embodiment, a ratio of the turbine frequencies is used to create a calibration curve.

During operation, if the mass flow measurement from the upstream turbine differs unacceptably from the measurement from the downstream turbine, the operating frequencies of the two turbines may be added together and divided by the viscosity in step 71. This value is used to determine what the percent difference in turbine frequency should be, according to the calibration curve plotted in step 70. The processor 29 compares the observed percent difference in turbine frequency with the plot value for percent difference in frequency in step 72. In making this comparison, the following characteristics are understood: (1) it is believed that it is highly unlikely for the upstream turbine to increase its pulse rate at any given flow rate; (2) a reduced pulse rate in the upstream turbine, for example due to increased bearing friction, will cause an almost proportional increase in pulse rate in the downstream turbine; and (3) it is believed that a fouled downstream turbine will reduce the pulse rate of the downstream turbine without materially affecting the upstream turbine.

With these assumptions in mind, it would be unexpected for the observed percent difference in turbine frequency to be substantially equal to the plot value, given the discrepant mass flow measurements from the upstream and downstream turbines. The calibration data stored in the PROMs in the processing unit 27 is therefore checked in step 73 to determine if the observed value and plot value are substantially equivalent. If the observed percent difference in turbine frequency is less than the plot value, the downstream turbine is checked in step 74, given that the assumption that the upstream turbine will not speed up leads to the conclusion that the downstream turbine is fouled. By isolating the error, the sum of the K factors for the two turbines may be corrected by the amount of error detected in the percent difference in turbine frequency, thereby salvaging the acquired data and allowing an accurate mass flow measurement to still be made.

If the observed percent difference in turbine frequency is greater than the plot value, the upstream turbine is checked in step 75, given that the upstream turbine presumably was fouled for example or slowed by increased bearing friction. The sum of the K factors for the two turbines should still be valid, however, due to hydraulic coupling such that a decrease in speed of the upstream turbine should result in an opposite, compensating increase in speed in the downstream turbine.

A fluid flow measurement assembly that may be installed into a fluid flow line simply and accurately and that measures volumetric fluid flow rate of mass flow and associated fluid parameters allowing for an accurate determination is shown and described. From the foregoing, it will be appreciated that, although embodiments of the invention have been described herein for purposes of illustration, various modifications may be made without deviating from the spirit and scope of the invention. Thus, the present invention is not limited to the embodiments described herein, but rather is defined by the claims which follow.

We claim:

1. A fluid flow measurement assembly for use in a fluid line through which a volume of fluid passes comprising:
   a first straightening vane;
   a diffuser provided downstream of the first straightening vane, and having an inlet and an outlet through which the fluid flows such that the fluid is substantially scrambled as it exits the diffuser;
   a second straightening vane provided downstream of the diffuser, such that fluid downstream of the second straightening vane is substantially normalized;
   a temperature probe and a pressure transducer positioned in the fluid line; and
   an upstream turbine and a downstream turbine provided in the fluid line, the two turbines being positioned downstream of the second straightening vane, a pulse detector being provided adjacent each turbine, the pulse detectors measuring the frequencies of the turbines as fluid flows through the turbines.

2. The fluid flow measurement assembly according to claim 1 wherein the upstream turbine and the downstream turbine rotate in opposite directions and the frequency of the upstream turbine is 5%–10% slower than the frequency of the downstream turbine.

3. The fluid flow measurement assembly according to claim 1 wherein the diffuser is substantially cylindrical, and is provided with a first upstream end that allows fluid to flow into the diffuser, and is provided with a plurality of holes extending from an inner surface of the diffuser through an outer surface of the diffuser, such that fluid within the diffuser flows out through the holes.

4. The fluid flow measurement assembly according to claim 1 wherein the diffuser, the first and second straightening vanes, the temperature probe, the pressure transducer, the turbines, and the pulse detectors are provided in an enclosure having an inlet and an outlet, the enclosure having a connector coupled to leads from the temperature probe, the pressure transducer, and the pulse detectors, such that the fluid flow measurement assembly is an integral unit that may be coupled to a fluid line by coupling the inlet orifice and the outlet orifice of the housing to the fluid line, and such that the temperature probe, the pressure transducer and the pulse detectors may be coupled to a system external to the housing via the connector.

5. A fluid flow measurement assembly, comprising:

an enclosure having an inlet orifice and an outlet orifice;

a diffuser having an inlet through which fluid flows and a plurality of outlets through which fluid is projected radially outwardly with respect to a fluid flow axis of the assembly to substantially scramble the fluid as it exits the diffuser;

a temperature probe and a pressure transducer provided in the enclosure; and two counter-rotating turbines adjacent each other, each turbine being provided with a pulse detector, the turbines and the pulse detectors being positioned in the enclosure such that the fluid flow measurement assembly is an integral unit that may be coupled to a fluid line by coupling the inlet orifice and the outlet orifice to the fluid line.

6. The fluid flow measurement assembly according to claim 5, further comprising a single connector coupled to leads from the temperature probe, the pressure transducer, and the pulse detectors, such that the temperature probe, the pressure transducer and the pulse detectors may all be coupled to a system external to the enclosure via the connector.

7. The fluid flow measurement assembly according to claim 5 wherein the inlet orifice is provided with a first flange and the outlet orifice is provided with a second flange, the first and second flanges being of unequal size, such that the assembly may be installed in the fluid line only one way, thereby preventing the assembly from being installed backwards.

8. The fluid flow measurement assembly according to claim 5 wherein the diffuser is provided in the enclosure upstream of the two turbines.

9. The fluid flow measurement assembly according to claim 8, further comprising:

a first straightening vane provided in the enclosure upstream of the diffuser and a second straightening vane provided in the enclosure downstream of the diffuser.

10. A fluid flow measurement assembly for use in a fluid line through which a volume of fluid passes comprising:

a first straightening vane;

a diffuser provided downstream of the first straightening vane, and having an inlet and an outlet through which the fluid flows such that the fluid is substantially scrambled as it exits the diffuser;

a second straightening vane provided downstream of the diffuser, such that fluid downstream of the second straightening vane is substantially normalized;

a temperature probe and a pressure transducer positioned in the fluid line;

an upstream turbine and a downstream turbine provided in the fluid line, the two turbines being positioned downstream of the second straightening vane, a pulse detector being provided adjacent each turbine, the pulse detectors measuring the frequencies of the turbines as fluid flows through the turbines;

a processor coupled to the temperature sensor, pressure transducer, and the pulse detectors, the processor having a data base with turbine calibration data including a plurality of predetermined values $K_A$ for the upstream turbine and a plurality of predetermined values $K_B$ for the downstream turbine, wherein the $K_A$ and $K_B$ values represent the frequency of each turbine for volumes of fluid flowing through the turbines at a know volumetric flow rate and viscosity, and the processor being programmed to:

normalize each value of $K_A$ and $K_B$ and the corresponding frequency/viscosity value to a selected reference temperature;

add the normalized values of $K_A$ and $K_B$ for each volumetric flow rate;

add the normalized frequency/viscosity values;

plot the sum of $K_A$ and $K_B$ versus the sum of the corresponding normalized frequency/viscosity values to create a calibration curve;

measure an initial density and viscosity of the fluid;

measure the temperature and pressure of the fluid, and measure a frequency of the upstream and downstream turbines at a given time, as an unknown quantity of fluid flows through the turbines;

calculate the density and viscosity of the fluid at the given time using the measured temperature and pressure;

combine the measure frequency of the two turbines at the given time, and divide the sum by the calculated viscosity;

correct the combined frequency/viscosity value to a selected reference temperature;

determine the value of the sum of $K_A$ and $K_B$ from the calibration curve generated as described above for the selected reference temperature;

correct the value of the sum of $K_A$ and $K_B$ from the reference temperature to the measured temperature;

calculate the volumetric flow rate of fluid through the turbines using the frequency of the meters and the corrected sum of $K_A$ and $K_B$; and calculate the mass flow rate of fluid through the turbines by multiplying the volumetric flow rate by the calculated density of the fluid.

11. The fluid flow measurement assembly according to claim 10 wherein the upstream turbine and the downstream turbine rotate in opposite directions and the frequency of the upstream turbine is 5%–10% slower than the frequency of the downstream turbine.

12. The fluid flow measurement assembly according to claim 10 wherein the diffuser is substantially cylindrical, and is provided with a first upstream end that allows fluid to flow into the diffuser, and is provided with a plurality of holes extending from an inner surface of the diffuser through an outer surface of the diffuser, such that fluid within the diffuser flows out through the holes.

13. The fluid flow measurement assembly according to claim 10 wherein the diffuser, the first and second straightening vanes, the temperature probe, the pressure transducer, the turbines, and the pulse detectors are provided in an enclosure having an inlet and an outlet, the enclosure having a connector coupled to leads from the temperature probe, the pressure transducer, and the pulse detectors, such that the fluid flow measurement assembly is an integral unit that may be coupled to a fluid line by coupling the inlet orifice and the outlet orifice of the housing to the fluid line, and such that the temperature probe, the pressure transducer and the pulse detectors may be coupled to a system external to the housing via the connector.

* * * * *